Oct. 23, 1934.        R. W. THOMAS        1,977,925
PRESSURE RATIO REGULATOR
Filed July 12, 1933
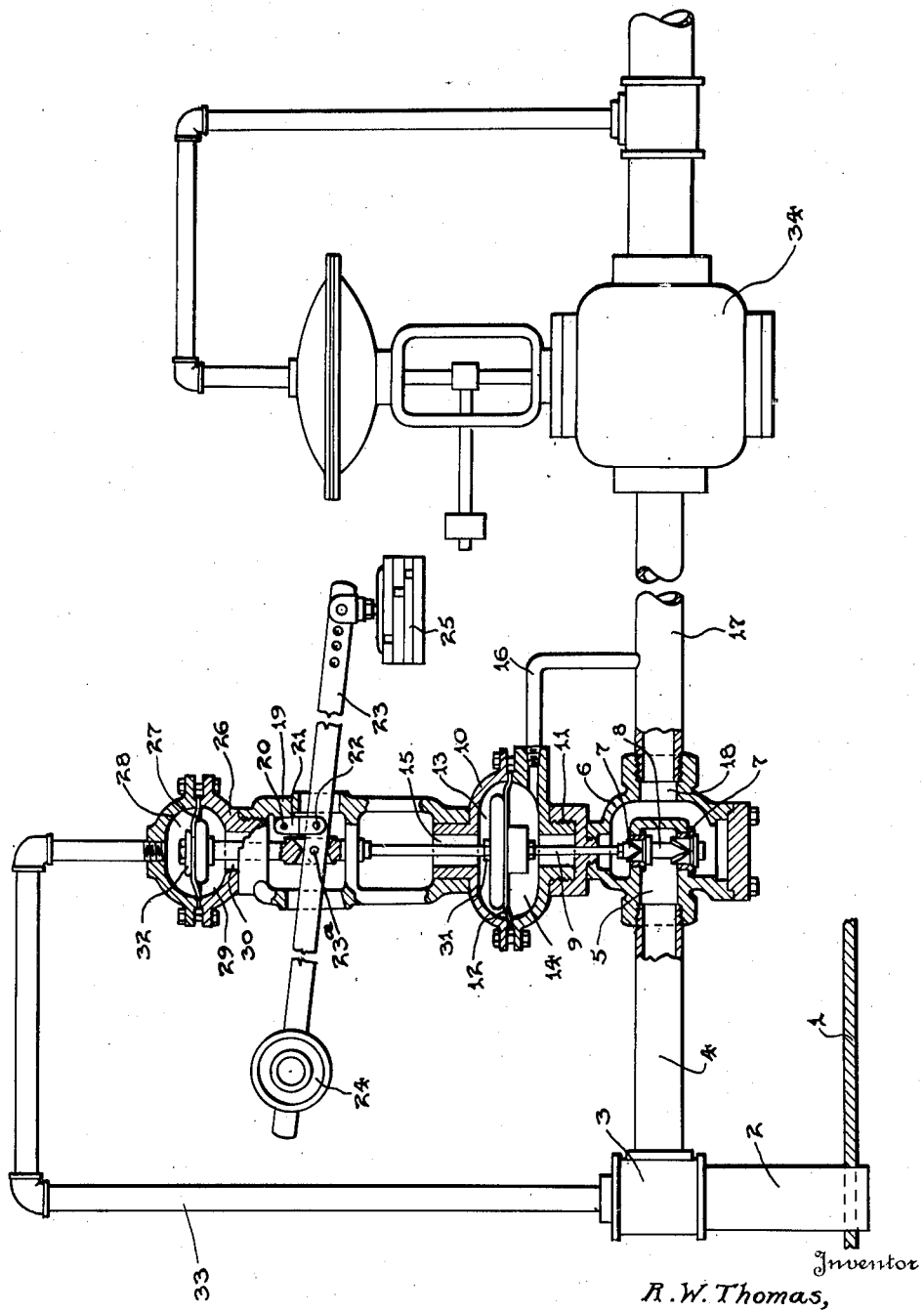
Inventor
R. W. Thomas,
By    Barry and Cyr
Attorneys Patented Oct. 23, 1934

1,977,925

UNITED STATES PATENT OFFICE 1,977,925

PRESSURE RATIO REGULATOR

Rosswell W. Thomas, Detroit, Mich., assignor to Phillips Petroleum Company, Bartlesville, Okla., a corporation of Delaware Application July 12, 1933, Serial No. 680,157

3 Claims. (Cl. 50—10)

This invention relates to improvements in pressure ratio regulators, and more particularly to a novel regulator for governing the flow of a fluid through a passageway. While the device is particularly useful in connection with liquefied petroleum gases, such as propane or butane, it will be obvious from the following that it is not limited to such use.

For gas plants or gas utilization equipment, there is a need for a special primary reducing regulator whose controlled or outlet pressure will vary as the upstream or storage tank pressure varies. In plants using liquefied propane or the like, this latter pressure naturally changes with atmospheric conditions, and with the demand on the tank, as the pressure within the tank is a function of the temperature of the liquid contained therein in line with the regular liquefied petroleum gas vapor pressure curve. Therefore, there is not only a seasonal variation in temperature and pressure, within the liquefied petroleum gas storage tank, but also a marked daily fluctuation, particularly between the heat of the day and the cold of the night. These changes in temperature, with corresponding changes in vapor pressure, make it essential that the primary reducing governor be located at the point of emission of the vaporized liquefied petroleum gas from the top of the storage tank, and that the pressure on the downstream side of the primary governor be always less by a considerable margin than the pressure inside the tank. With an ordinary regulator set, for instance, to reduce the pressure of the vapor being withdrawn from the tank, to 60 pounds in the primary stage, with the final reducing governor carrying it from 60 down to, say 3 pounds, no difficulty will be experienced until the gas tank pressure gets down to 60 or 65 pounds, in which case there is no differential to speak of across the primary governor, and the pressure in the line leading to the secondary regulator is equal to the vapor pressure on the tank, in which case objectionable condensation is very likely to occur, even under normal temperature conditions, with resulting erratic performance of the secondary regulator, due to the intense refrigeration and to the fact that it is endeavoring to control liquid when it was built to control a gas.

Therefore, the primary object of the present invention is to provide a ratio governor which will entirely obviate the difficulties of the present plants, and which will be a distinct advance in the art of utilizing liquefied petroleum gases, such as propane or butane.

With the foregoing objects outlined and with other objects in view which will appear as the description proceeds, the invention consists in the novel features hereinafter described in detail, illustrated in the accompanying drawing, and more particularly pointed out in the appended claims.

The figure is a vertical sectional view partly in elevation, of my improved ratio type primary regulator, shown hooked up in a pipe line leading from a liquefied gas storage tank to a standard type secondary regulator, although the use of the latter regulator is optional.

Referring to the drawing, 1 designates a portion of a pressure tank adapted to contain any fluid, the vapor pressure of which varies with changes in temperatures. The vapor from such fluid is discharged from the tank by means of a pipe 2 that is connected by a T 3 to a pipe 4. The outlet end of the latter is connected to the inlet passageway 5 of a valve casing 6 that has ports 7 controlled by a balanced valve head 8 that is actuated by a rod 9.

A diaphragm casing 10 is superposed on and connected to the casing 6 by a threaded joint 11; and a movable partition 12, which may be a diaphragm, is arranged in the casing and divides the same into an upper chamber 13 and a lower chamber 14; the two chambers being prevented from communicating with one another by means of the imperforate partition.

The chamber 13 preferably communicates with the atmosphere through a port 15 at the upper end of the casing 10, but the chamber 14, by means of a tube 16, communicates with the outlet pipe 17, which leads from the outlet port 18 of the valve casing on the downstream side of the valve.

A cage 19 rests on the casing 10 and pivotally supports at 20, a bifurcated link 21 that is pivotally connected at 22 to a counter-weight lever 23. This lever passes through the valve rod and is pivotally connected to the latter at the point 23, and it may be provided with one or more counterweights 24 and 25 which may be adjusted along the lever.

Another diaphragm casing 26 is supported on the cage, and it contains a movable imperforate partition 27 which divides the interior of the casing into an upper chamber 28 and a lower chamber 29, the latter communicating with the atmosphere through a port 30. The valve rod extends up through both partitions and is connected to the lower one, as shown at 31, and to the upper one, as shown at 32.

A second tube 33 places the pipe 2 at the upstream side of the valve in communication with the chamber 28.

A secondary regulator 34 of standard type, may or may not be interposed in the pipe 17 between the downstream port 18 of the valve and the point of distribution of the vapor.

From the foregoing it will be understood that my device includes opposing dissimilar sized diaphragms or movable partitions 12 and 27, the larger of which is acted on by the reduced pressure on the downstream side of the valve, and the smaller of which is influenced by a higher pressure on the upstream side of the valve. The movement of the apparatus is aided by the counter-weights, which, of course, may be substituted by a spring arrangement if desired. Such arrangement partially balances the downstream pressure, and is augmented by the upstream pressure on the smaller diaphragm 27.

The lever and weights can, of course, be dispensed with entirely, in which event the device becomes a true ratio regulator which should always maintain a downstream pressure of some pre-determined percentage of the upstream pressure, dependent upon the relative areas of the diaphragms (or in the case of equal size diaphragms, in accordance with the mechanical advantage of the linkage between the same). The use of a weight lever, spring or other means of loading merely introduces easier adjustability from the operator's standpoint.

While I prefer to employ diaphragms of dissimilar sizes, of course, two identically sized diaphragms can be used with linkage or leverage connecting them to the valve 8 in order to maintain the desired ratio between upstream and downstream pressures. Assuming, for example, that it is decided that the downstream pressure on the primary regulator shall always be 50% of the upstream pressure, this can readily be accomplished by means of my improved ratio regulator. However, when the pressure within the storage tank goes to a very low point, the primary governor will remain wide open, letting the secondary governor 34 handle the load on a single stage basis.

I have shown the valve 8 as of the conventional double-seated full balanced or semi-balanced type, but it may be noted that in some instances, it may be possible to use a single seated unbalanced valve which would give a better shut-off. Such a valve might be used in situations where the downstream pressure control on this primary regulator need not be extremely accurate.

From the foregoing it is believed that the structure, operation and advantages of the invention will be readily understood by those skilled in the art, and it is manifest that changes may be made in the details disclosed, without departing from the spirit of the invention, as expressed in the claims.

What I claim and desire to secure by Letters Patent is:

1. In combination, a pipe line for conducting a flowing stream of fluid, a valve interposed in the line for controlling the flow of the fluid, a movable valve head forming part of said valve, a rod for actuating said valve head, a first casing, an imperforate movable partition arranged in said casing and dividing the interior of the same into two chambers, one of said chambers being in communication with the atmosphere, a tube placing the other chamber in communication with the pipe line at the downstream side of the valve, said rod being operatively connected to said movable partition, a second casing, a smaller imperforate movable partition in the second casing dividing the latter into two chambers, one of the last mentioned chambers being in communication with the atmosphere, a tube placing the other one of the last mentioned chambers in communication with the pipe line at the upstream side of the valve, said rod being operatively connected to the last mentioned movable partition, and means operatively connected to the rod and tending to always move the valve head in one direction, the first casing being mounted on the valve and the second casing being mounted on the first casing, and the rod extending through the first casing and into the second casing.

2. In combination, a pipe line for conducting a flowing stream of fluid, a valve interposed in the line for controlling the flow of the fluid, a movable valve head forming part of said valve, an element for actuating said valve head, a first casing positioned at one side of said pipe line, an imperforate movable partition arranged in said casing and dividing the interior of the same into two chambers, one of said chambers being positioned closer to the pipe line than the other and being in communication with the atmosphere, a first passageway placing the other chamber in communication with the pipe line at the downstream side of said valve, said element being operatively connected to said movable partition, a second casing positioned at the same side of the pipe line but arranged further away from the pipe line than the first casing, a smaller imperforate movable partition in the second casing dividing the latter into two chambers, one of the last mentioned chambers being nearer to the pipe line than the other and being in communication with the atmosphere, a second passageway placing the other one of the last mentioned chambers in communication with the pipe line at the upstream side of the valve, and means operatively connecting said element to the last mentioned movable partition.

3. In combination, a pipe line for conducting a flowing stream of fluid, a valve interposed in the line for controlling the flow of the fluid, a movable valve head forming part of said valve, a rod for actuating said valve head, a first casing positioned at one side of said pipe line, an imperforate movable partition arranged in said casing and dividing the interior of the same into two chambers, one of said chambers being positioned further away from the pipe than the other and being in communication with the atmosphere, a first passageway placing the other chamber in communication with the pipe line at the downstream side of the valve, said rod being operatively connected to said movable partition, a second casing on the same side of said pipe, positioned further away from the pipe line than the first casing, an imperforate movable partition in the second casing dividing the latter into two chambers, one of the last mentioned chambers being positioned nearer the pipe line than the other and being in communication with the atmosphere, a second passageway placing the other one of the last mentioned chambers in communication with the pipe line at the upstream side of the valve, said rod being operatively connected to the last mentioned movable partition, and means operatively connected to the rod, arranged between said casings and tending to always move the valve head in one direction, the last mentioned means including a lever having its medial portion pivotally supended from the second casing, means pivotally connecting the medial portion of the lever to said rod, and adjustable weights arranged on the end portions of the lever.

ROSSWELL W. THOMAS.